United States Patent

Bastone et al.

[15] 3,655,468

[45] Apr. 11, 1972

[54] FLUID-HANDLING CONSTRUCTIONS, APPARATUS AND METHODS OF PRODUCTION

[72] Inventors: Andrew L. Bastone, Granville; Justin R. Boeker, Newark, both of Ohio; Fred E. Klimpl, West Orange, N.J.

[73] Assignee: Owens-Corning Fiberglas Corporation

[22] Filed: Apr. 13, 1970

[21] Appl. No.: 22,431

Related U.S. Application Data

[62] Division of Ser. No. 387,945, Aug. 6, 1964, Pat. No. 3,412,891.

[52] U.S. Cl..............................156/62.2, 156/69, 156/162, 156/171, 156/172, 156/173, 156/189, 156/192
[51] Int. Cl.......................................................B32b 17/04
[58] Field of Search................156/69, 162, 165, 169, 171, 156/172, 173, 175, 176, 178, 179, 184, 189, 192, 429, 431, 298, 62.2; 220/3

[56] References Cited

UNITED STATES PATENTS

| 2,801,946 | 8/1957 | Evenblij...................................156/69 |
| 2,977,269 | 3/1961 | Nerwick..................................156/184 |
| 3,098,582 | 7/1963 | Martin....................................156/172 |
| 3,335,903 | 8/1967 | Anderson...................................220/3 |
| 3,366,522 | 1/1968 | Underwood..............................156/69 |
| 3,449,188 | 6/1969 | Huff........................................156/173 |
| 3,483,054 | 12/1969 | Bastone.................................156/175 |
| 3,514,839 | 6/1970 | Rodrigues..................................220/3 |
| 2,801,946 | 8/1957 | Evenblij...................................156/69 |
| 3,098,582 | 7/1963 | Martin....................................156/172 |
| 3,116,547 | 1/1964 | Nepple....................................156/172 |
| 3,210,228 | 10/1965 | Bluck......................................156/172 |
| 3,239,092 | 3/1966 | Levenetz.............................156/298 X |
| 3,282,757 | 11/1966 | Brussee..................................156/165 |
| 3,366,522 | 1/1968 | Underwood..............................156/69 |

*Primary Examiner*—John T. Goolkasian
*Assistant Examiner*—D. J. Fritsch
*Attorney*—Staelin & Ooerman and L. H. Blair

[57] ABSTRACT

Production of large underground corrosion resistant storage tanks, e.g., 10,000 gallon capacity, from a normally mobile resin and chopped reinforcement Ability to "hold" the rein in place until it cures is provided by a stabilizing mat layer or medium.

8 Claims, 30 Drawing Figures

PATENTED APR 11 1972 3,655,468

INVENTORS
ANDREW L. BASTONE,
JUSTIN R. BOEKER &
BY FRED E. KLIMPL

ATTORNEYS

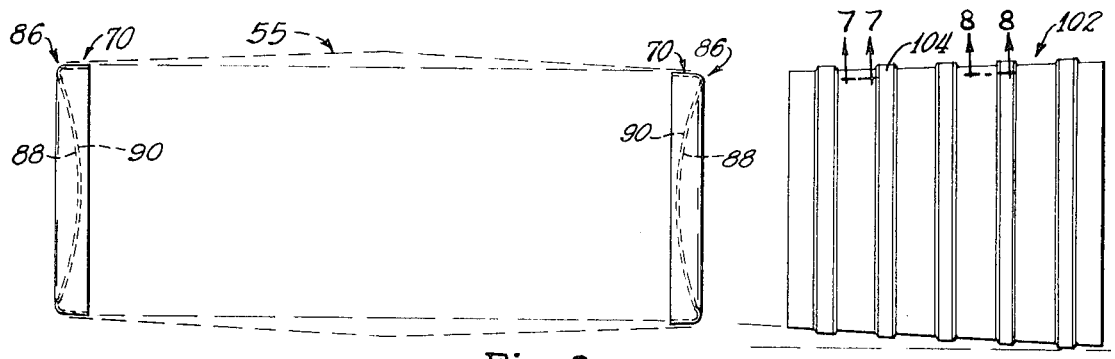
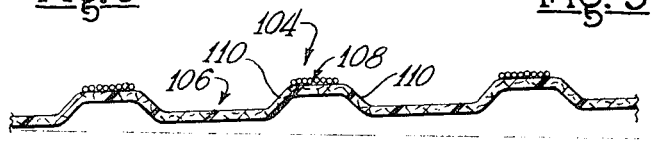
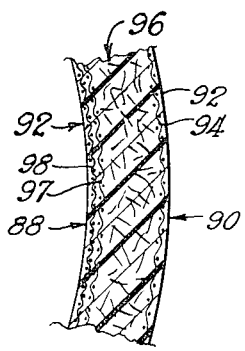
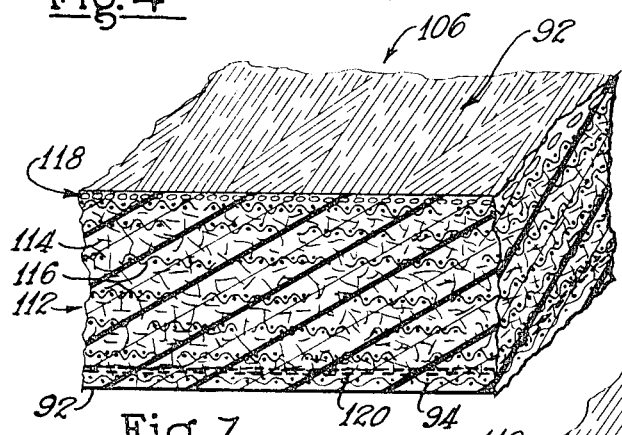
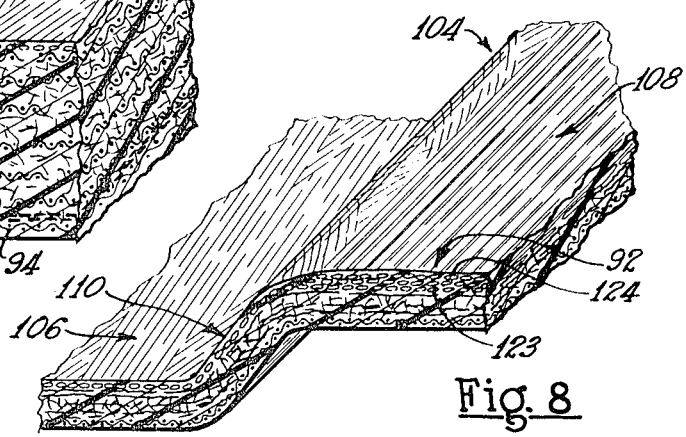

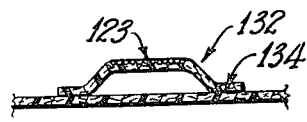
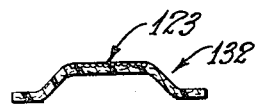
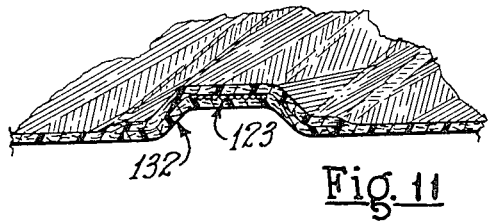
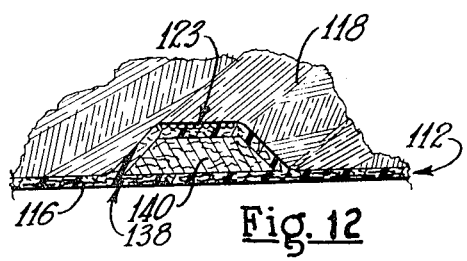
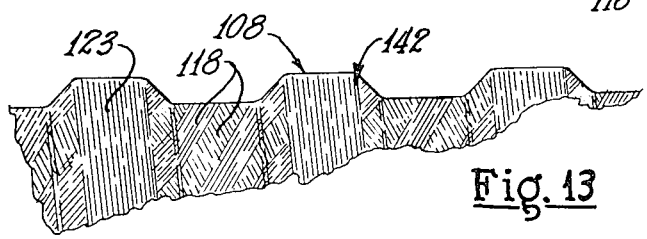
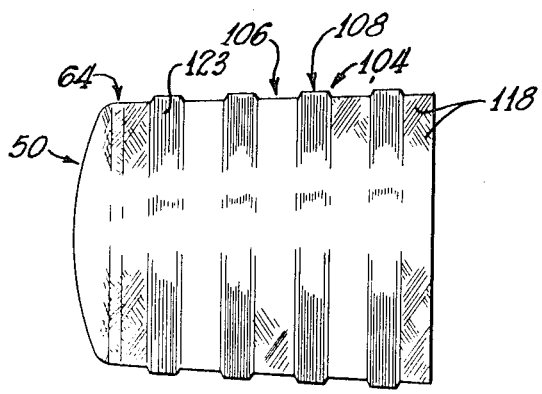

INVENTORS
ANDREW L. BASTONE,
JUSTIN R. BOEKER &
BY FRED E. KLIMPL

ATTORNEYS

FLUID-HANDLING CONSTRUCTIONS, APPARATUS AND METHODS OF PRODUCTION

This is a division of copending application Ser. No. 387 945 filed Aug. 6, 1964 now U.S. Pat. No. 3,412,891 dated Nov. 26, 1968.

This invention relates to fluid-handling wall structures, storage vessels, and conduits made therefrom, and to apparatus and methods of production.

The Problem

Corrosion by underground fluids, such as soil acids, as well as the liquid stored within a tank, has been a severe problem of black iron tanks heretofore used for the underground storage of liquids such as gasoline.

Black iron tanks are coated with an asphalt paint which is of low abrasion resistance. Further, it is of relatively low durability in most environmental media. Naturally, when placed underground in the presence of soil water on the outside, and the corrosive agents in the liquid stored within, destruction by corrosion is an imminent ending for such structures. First, as the tank is shipped from its point of manufacture to the site of use, and as the tank is placed in the ground at the site of use, the exterior protective coating will be abraded; this starts the corrosion process.

Therefore, a substantial advance to the art would be provided by underground storage tanks and associated fluid-handling vessels having the following characteristics:

Long life as characterized by a high degree of corrosion resistance to ambient elements; and Radial crush resistance of a high level of magnitude.

It is also obvious that apparatus for producing such fluid-handling components and methods for their production would also contribute substantially to the art.

However, in order to make tanks and analogous fluid-handling vessels of a glass composite, the poor stiffness factor of the composite must be surmounted. Glass filaments are of such high strength that when embedded in a matrix material such as a hardened resin, the section is so thin as to be flexible and lacks necessary stiffness to resist radial collapse forces. Internal bursting forces are rather easily surmounted by the strength factor. However, the radial collapse force as in an earth buried tank does present a challenge. Therefore, skillful application of the tensile strength of glass is necessary in order to provide appropriate stiffness. It is from the foregoing that the present invention was born.

The problem with glass is to provide wall stiffness with low glass content. Thus, the composite structure must not contain an unnecessarily high glass content for stiffness, because the cost of glass will prevent economic competition. Also, in the case of underground storage tanks encountering high earth loadings, stiffness alone is not enough. Therefore, rib structures are provided by this invention.

It is an object to provide an underground storage tank made by a process comprising filament-winding as a part thereof, and holding a mobile resin system in place during the filament-winding operation.

A further object is to provide a method of forming components at a central manufacturing point, and then shipping the components in nested form for tank assembly at the use situs.

A further object is to provide a method of producing a stiff but low-glass content wall structure in a single step by "holding the liquid resin in place" while compacting with a filament-wound overwrap.

Other objects of this invention will appear in the following description and appended claims, reference being had to the accompanying drawings forming a part of this specification wherein like reference characters designate corresponding parts in the several views.

FIG. 3 is a side elevational view of a concave end cap of invention, and further schematically illustrating a pressure-resistant tank made therefrom;

FIG. 4 is an enlarged, sectional view illustrating an end cap construction;

FIG. 5 is an elevational view of a wall increment made in accordance with the present invention;

FIG. 6 is an enlarged, fragmentary, sectional view of the side wall increment of FIG. 5, showing the profile of the rib for radial crush resistance;

FIG. 7 is an enlarged, fragmentary, perspective, sectional view about double actual size, as taken between the strengthening ribs, along line 7—7 in FIG. 5;

FIG. 8 is a fragmentary, sectional, perspective view about actual size of the wall structure at the rib, as taken along line 8—8 of FIG. 5;

FIG. 9 is a transverse sectional view of a separately formed loop-type rib, for application to a smooth frusto-conical wall of the type shown in FIG. 2, to produce a structure of the type shown in FIG. 5;

FIG. 10 is a fragmentary, sectional view showing the rib of FIG. 9 used to produce a structure similar to the structure of FIG. 5 (however, note that there is a difference: compare with FIG. 6, where the bottom of the rib has no bridging wall as in FIG. 10);

FIG. 11 is a fragmentary, sectional, perspective view similar to FIG. 10, but wherein criss-cross helical windings are laid on top of the ribs to bury the peripheral windings of the ribs beneath the surface for unusual strength;

FIG. 12 is a fragmentary, sectional, perspective view showing a rib filled with a low-density, form-developing material, as applied after part of the resin-rich layer is developed on the forming mandrel, and the remaining materials then laid on over the form-developing material;

FIG. 13 is a fragmentary, elevational view of a fluid-handling wall structure of invention embodying a continuous, spirally formed rib for radial crush resistance;

FIG. 14 is an elevational view of a completed tank segment of invention, comprising a ribbed tank wall increment and a joined convex end cap;

FIG. 15 is about twice actual size;

Figure 27:
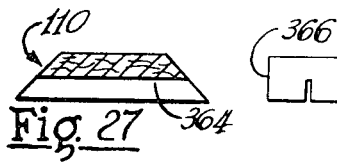
Figure 28:
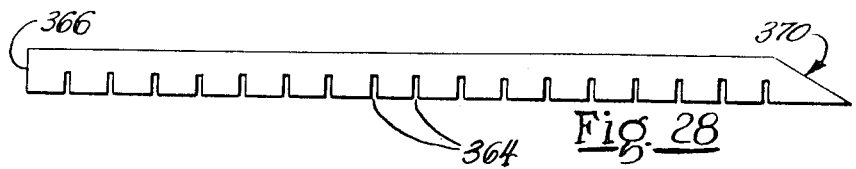
Figure 29:
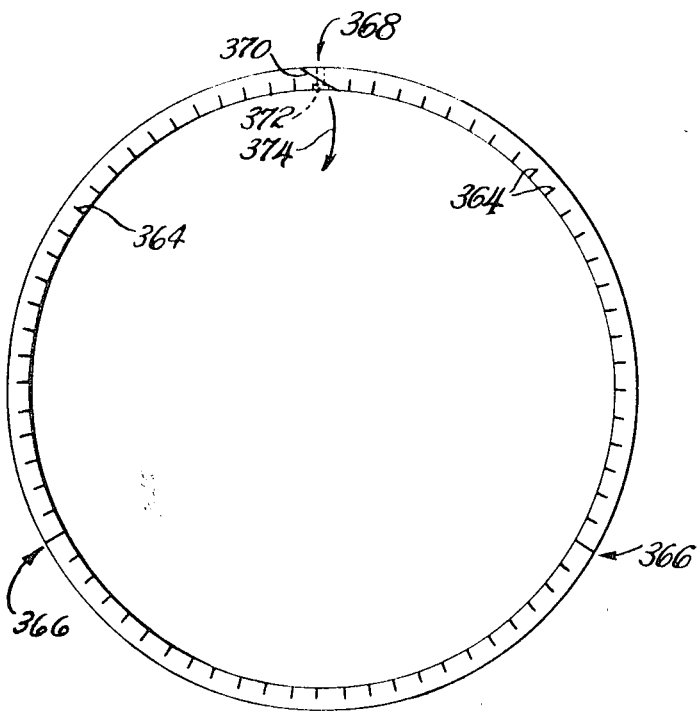
Figure 24:
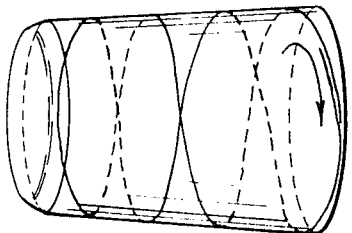
Figure 25:
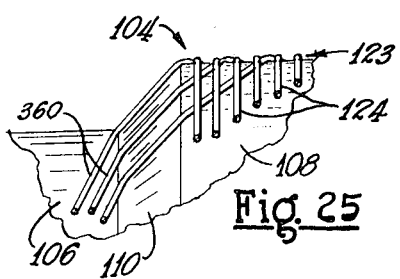
Figure 26:
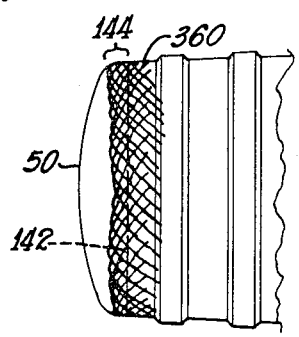
Figure 30:
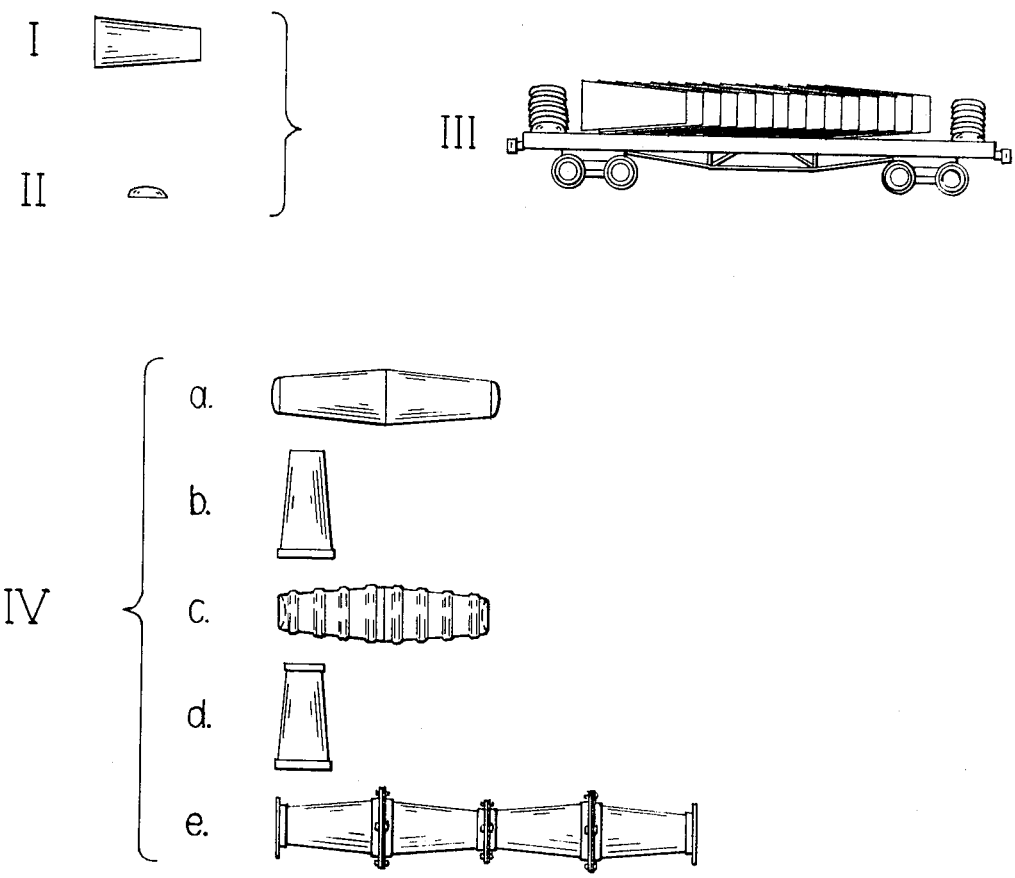

FIG. 24 schematically illustrates the helical development of the filament-wound overlay;

FIG. 25 is an enlarged, fragmentary, elevational view showing filament overlay at the ribs;

FIG. 26 is a fragmentary, elevational view illustrating filament overlap onto the end cap to anchor the end cap to the endless wall increment;

FIG. 27 is a transverse sectional view of one form of rib component;

FIG. 28 is a side elevational view of the form of rib component shown in FIG. 27;

FIG. 29 is an elevational view of a completed rib made from the component of FIGS. 27 and 28;

FIG. 30 is a schematic illustration of the manufacturing process inherent in the invention, as regards the production of components and shipment in nested form, for field assembly.

1. The Tank Components:

Briefly, it can be stated that the ultimate unit of construction in accordance with the present invention is one-half of a tank, called a construction segment, comprising an end cap increment and a frusto-conical wall section called a wall increment, these two units being joined together. It will be understood that, due to the tapered nature of the tank wall, these units can nest one within the other for transportation purposes.

The Convex Cap

Figure 1:
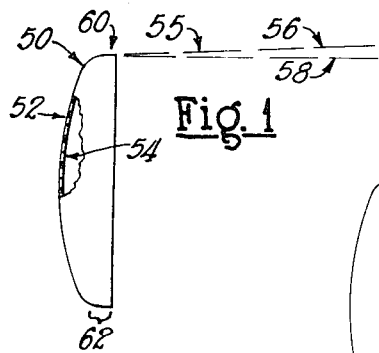
FIG. 1 is a side elevational view, partly in section, of a convex tank end made in accordance with this invention.

Referring to FIG. 1, an end cap 50 is shown that can be used to produce storage tanks for liquids. Cap 50 has an outer convex surface 52 and an inner convex surface 54. The tank wall, as designated by dotted outline 55, and to which the end cap 50 is joined to produce a tank half segment, has a slight taper, illustrated between lines 56 and 58.

In order to fit on the end of the mandrel and mate to wall 55, the peripheral wall portion 60 of end cap 52 has the same taper, as along the bracketed area 62.

Figure 2:
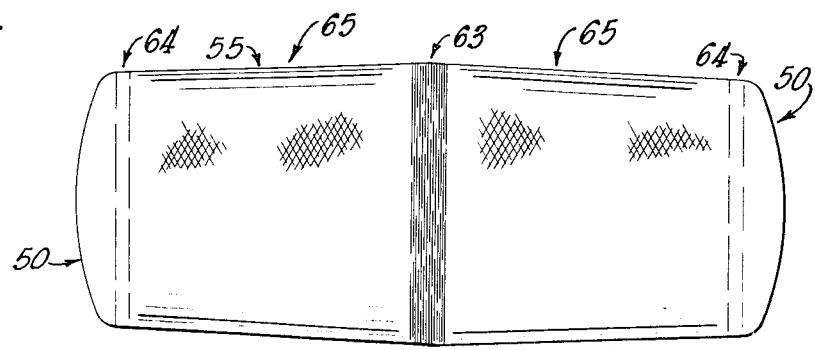
FIG. 2 is a side elevational view of one form of the tank of invention, made with the tank end of FIG. 1.

A general tank profile made, using the end cap 50 and a wall designated 55 in FIG. 1, is shown in schematic outline in FIG. 2. Here, the end cap 50 has been joined to the tank wall increment 55 along the weld area 64. A tank half or constructional segment 65 is the result. In FIG. 2, two such segments 65 have been joined by a central weld 63 to produce a complete tank.

The Concave End

As shown in FIG. 3, this type of end cap is designated 86. The outer surface 88 is concave and the inner surface 90 is convex. The lip 70 is tapered the same as wall 55.

Cap 86 is designed to resist internal pressures in a vessel.

The manner in which a pressure vessel is fabricated is illustrated schematically in FIG. 3, utilizing a convex cap 86 at the end of a frusto-conical wall increment 55. Two of these are joined at the center to form a tank.

It is to be noted that the structure of the end caps is a relatively simple lay-up. This is illustrated in FIG. 4, and is essentially a matrix of chopped strand and resin. The inner surface 90 is resin-rich 92 for corrosion resistance. Next, there is an optical surface mat 94, followed by the substantial thickness of chopped strand and resin matrix 96. On top of the layer 96 is a layer 98 of surfacing mat. This is optional where the matrix 96 is sufficiently glass-rich to provide a protective coating of resin on the surface.

As a usual thing, the chopped strand and resin structure will meet the design standards for most vessels. However, as for example with the concave caps 86 just described, higher burst resistance may be in order. This may be provided by an outer shell of roving or glass cloth 97.

The Frusto-conical Wall Increment

This is shown in FIG. 5 of the drawings and is designated by the numeral 102. This is a preferred form of the invention for resisting external crushing forces, as an earth overburden for a buried tank. The structure is essentially an open-ended, frusto-conical, endless wall form. However, in addition to the simple taper previously mentioned by numeral 55 above, the wall 102 includes a plurality of axially spaced rib structures 104. These extend peripherally of the wall segment 102 and act in the nature of barrel hoops to resist inward crushing forces. This structure will also resist outward bursting pressures, as for storing compressed materials.

The profile of the ribs 104 is shown in greater detail in FIG. 6. Thus, there are valley sections 106 between each of the ribs 104. Each rib 104 comprises an upper plateau region 108. These have sloping sides 110. In this particular embodiment, the sides slope at about a 45° angle and extend between the plateau regions 108 and the valley regions 106.

The Valley Structure

This is shown in FIG. 7. A resin-rich surface 92 is indicated on the inside. This is pure resin and is held in place by an optional surface mat 94 that is laid directly on the mandrel at the time of formation. The purpose of the resin-rich layer is to provide corrosion resistance against the fluid being stored.

In the center of the structure is a rather heavy layer that is resin-rich in character. This is designated 112 because different in structure from the pure chopped strand resin layer 96 of the end cap of FIG. 4.

As is meant to be conveyed by FIG. 7, the chopped strand segments 114 extend in random array. All are in a generally planar configuration, but are criss-crossed relative to one another. Thus, they provide strength in all directions in the body of layer 112.

An important feature of the present invention resides in the attainment of a wall structure that is stiff yet of low glass content. It will be appreciated by those skilled in the art that this is an easy goal to attain where enough glass cloth or filament-wound materials are used to provide thickness, and thus stiffness or rigidity. However, when so operating, the amount of glass used is wastefully high because the strength of only a portion of it is needed for necessary strength. The task therefore is to achieve stiffness by a less expensive medium.

It might be stated at this point that it is known to first gel a chopped strand layer before covering with a filament-wound material. However, this is an expensive procedure because the resin subsequently applied with the filament-wound material must also be polymerized to provide a finished structure, e.g., a two-step process.

Also, an inherent weakness asserts itself relative to this dual layer constructional technique. It cannot be stated with certainty that formation of two layers causes them to weld into an effective monolithic structure. There is always the parting line where first one resin was hardened and then another resin was placed thereon and subsequently polymerized.

In accordance with the present invention, a novel feature is provided by polymerizing both the resin-rich layer 112 and the subsequently applied, filament-wound layer in one step, thereby providing a truly monolithic, composite body. This is made possible by a mechanical stabilizer.

Figure 17:
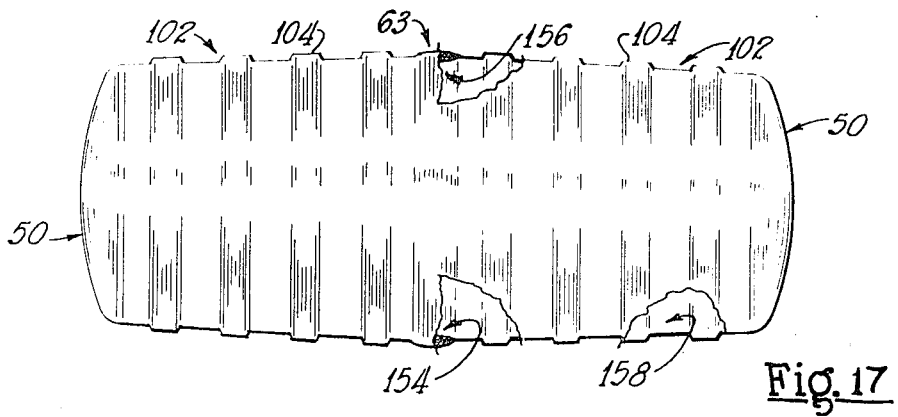
FIG. 17 is an elevational view of an end product tank for underground gasoline storage.

For purpose of exemplary discussion, and as actually used in manufacture of a tank shown in FIG. 17, cotton scrim was dispersed within the resin-rich layer as a stabilizer. However, within the extended scope of invention, glass strand scrim, glass surfacing mat, Mylar-modified polyester fibers and the like, formed into an open-mesh type of scrim, can be used.

The purpose of this material is to stabilize the resin-rich section 112 against fluid flow during formation. In order to do this effectively, the scrim 116 is not just placed over the entire layer of resin and chopped strand. Instead, it is preferably applied in layers, on top of each increment layer of chopped strand and resin as applied to the forming mandrel. Thus, a thin layer of chopped strand and resin and an overlayer of scrim are present in a repetitive pattern.

By so operating, the entire mass remains coherent and resists flow during formation, to produce a product that retains its high resin content for stiffness with low glass content for adequate strength, yet economy of manufacture.

Next on top of the chopped strand resin matrix 112 there appears a filament-wound layer 118. This is made of a plurality of criss-cross, spirally oriented plies of continuous strand. These are laid directly over the chopped strand resin matrix 112. It will be evident that during application of such a filament-wound layer 118 the soft and fluid resin-rich matrix 112 will be displaced unless it is stabilized as indicated by the scrim interlayers 116.

Thus, a point of novelty becomes evident in the present invention by a stabilized, resin-rich, chopped strand layer 112. This gives high bulk and stiffness, with nevertheless appreciable strength by virtue of the glass content. The overwrapped filament-wound layer 118 provides tremendous shell strength. Thus, a low-cost and competitively priced wall is achieved even though a relatively high cost item in the form of glass is utilized. Further, this wall is superior in corrosion resistance, light weight, and economy of shipping.

As pointed out above, in order for fiber-reinforced plastic tanks to compete with the economically entrenched and traditionally used iron tanks, skillful use must be made of the extremely high tensile strength of glass fibers, or the modulus factor thereof. In fact, the modulus is so favorable that a wall of sufficient strength has substantially no bulk and is, therefore, flexible. Accordingly, the challenge has been met in the present invention in a single step operation.

From the foregoing, it is vigorously submitted that the structure disclosed above as made by stabilizing a resin-rich layer to produce stiffness in a glass-containing body provides a substantial advance to the art. Further, novelty is evidenced by the fact that in being made in a single step, a monolithic structure is produced that inherently contains features of strength that could not be obtained in a two-step operation as mentioned above. Therefore, invention is evident from the stabilizer 116 to provide this unique structure in a single step.

Further, the tank of invention is a flexible system, depending on its strength to transfer the earth overburden load to the surrounding earth, when used for underground storage. In simple terms, a strong, flexible material is used to advantage by its ability to deflect and transfer the load to the surrounding earth.

Returning now for a moment to the bottom portion of FIG. 7, note a glass flake layer 120. This is optionally added in order to make certain that a fluid barrier is produced by the total wall composite.

The Outer Resin-Rich Surface

For purposes of external corrosion resistance, the layer of filament-wound roving 118 acts as a surfacing mat to procude a resin-rich surface 92 on the outside of the finished article.

A number of materials can be used to load or extend the glass-resin matrix 112. These include silicates in powdered form, calcium carbonate, glass flakes, titanium dioxide, mica platelets, and others. In some instances, even fine sand or powdered silica can be used.

The Rib Structure

By reference to FIG. 8, observe the rib structure 104. This structure 104 contains all of the components of the valley structure 106 and, accordingly, the reason why FIG. 8 has not been magnified to the degree of FIG. 7. However, an additional component of the rib structure 104 over the valley structure 106 is atop the plateau area 108. This comprises a layer 123 of truly peripherally wound, continuous glass strand 124. These are embedded in resin and act as a surfacing mat to hold the resin-rich surface 92 in place as previously described.

This peripheral layer 123 produces the action of a barrel hoop that is tremendously efficient in resisting external crushing forces as encountered in the underground gasoline storage situation, as where a water-logged earth fill surrounds a buried tank. Tremendous crushing forces are present, and these are particularly severe when the tank is empty and the inside of the tank wall is not supported by an incompressible body of liquid.

At this point, it should be mentioned that this crush resistance also manifests itself by resisting oil canning. In order to hold a tank underground in high water table conditions, straps must be used to anchor the tank in the ground. These are placed around the ends of the tank and fastened to concrete piers to prevent the tank from bursting out of the ground under such conditions.

It will be evident that when a high water table bears against a so-anchored tank, and when the tank is empty, it will collapse between the straps, unless stressed to stand the forces. Thus, it will be evident that the rib structure comprises an important feature of the invention.

The prior discussion has related to integrally formed ribs. However, other ramifications are possible. Thus, in FIG. 9, there is shown a separately formed and applied rib structure 132. This is applied as in FIG. 10, to a smooth, tapered wall structure of the nature of that shown in FIG. 2. A bond is effected by application of cement at the point 134.

It is to be understood that the loop ribs 132 will be of graded sizes to fit at spaced points along the length of the tank wall increment 55.

The Extension Shown in FIG. 11

This also includes the use of the separately formed rib 132 of FIG. 9. The final structure is made by applying the rib 132 directly to the mandrel. Then, the wall is laid up over this rib so that the two become integrally fused together.

Presuming that the ribs 132 are of the same structure as in FIG. 9, they will be understood to have a top layer or overlay of peripherally wound continuous strands 132 for radial strength. By operating in accordance with FIG. 11, these now become buried well within the wall mass, rather than being only beneath the top, resin-rich layer 122, as shown in FIG. 8. This may be understood to give a unique modulus structure capable of withstanding certain types of forces not readily absorbed by the structure of FIGS. 8 or 10.

The Further Extension of FIG. 12

Here the rib is either a separately formed item or an in situ-formed item. In the separately formed aspect, it is made from a material of relatively high density, but analogous to a sponge. Thus, high density blown fiberboard or foamed polyurethane would be illustrative of typical materials. These may be pre-formed, as in the case of the high density glass fiberboard. However, as regards the foamed polyurethane, this can be laid on part of the chopped strand layer, as indicated by the reference numeral 138 of FIG. 12.

From the foregoing, it will be evident that the rib member 140 or substance thereof is buried within the chopped strand layer, designated by the reference numeral 112.

As in prior formations, the scrim stabilizer 116 is used to prevent fluid flow when the filament-wound layer 118 and the truly peripherally applied layer 123 are applied.

In this embodiment, added stiffness is also supplied by the buried rib of a material having substantial body, but low density.

In this embodiment, the polyurethane rib may be formed by foaming onto the partially completed, chopped strand matrix during formation, as well as being performed and applied as described above.

Other rib forms, as of a hollow, box-like cross section can also be used, like the polyurethane.

The Spiral Rib

This is shown in FIG. 13 and is analogous to the embodiments previously described. The distinction is evident by the fact that the rib 142 is continuous. Also, the rib is a spiral instead of a truly peripherally extending hoop.

The construction is the same as that of FIG. 8, 10, 11 or 12. Thus, the filament-wound overlay 118 covers the chopped strand-resin matrix; and, on the plateau regions 108, are the peripheral windings 123 that are "oriented in the direction of the rib".

The Assembled Cap and Wall, Forming a Tank Constructional Segment

A tank or fluid handling segment of construction is illustrated in FIG. 14. This comprises a cap end 50, per FIG. 1, and a ribbed wall increment 102 from FIG. 5. These parts are integrally joined together by method and apparatus that will be discussed later. The joint, is indicated at 64. The filament-wound layer is indicated by the reference numeral 118, and the peripherally oriented, hoop-forming layer, by the numeral 123.

Figure 15:
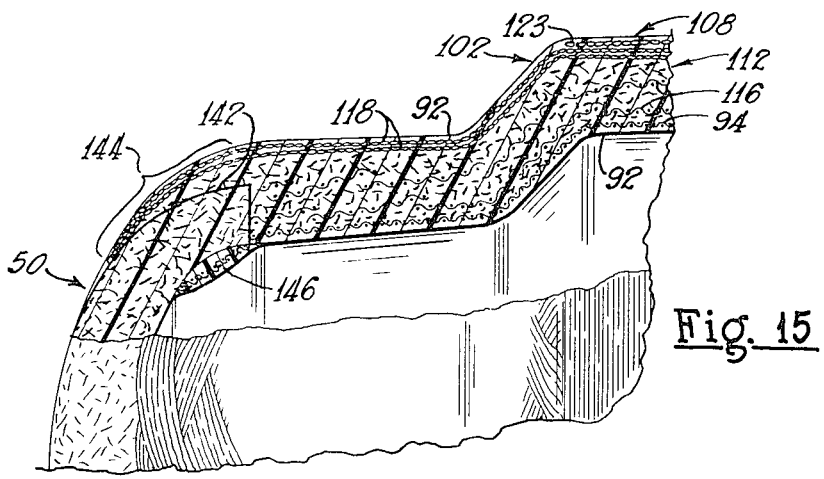
FIG. 15 is an enlarged, fragmentary, elevational view, partly sectioned to show the wall structure of FIG. 14, this view being particularly presented to show the welded joint between the end cap and the endless wall.

As shown in FIG. 15, the internal surface 92 is resin-rich for corrosion resistance. Above this, and optionally holding it in place, is a layer of surface mat 94. Above the surface mat 94 is a substantial "body" 112 of resin-rich chopped strand with the scrim interlayers 116 for stabilization. Next follows the criss-cross wound filament layer 118, and on the plateau areas 108, the peripherally wound layer 123, with a resin-rich outer surface 92.

The line 142 is in the place where the end cap 50 of resin-rich chopped strand joins to and is overlapped by the resin-rich chopped strand stratum 112 of the body increment 102.

The bracketed area 144 indicates an overlap of the criss-cross filament-wound material 118 from the frusto-conical side wall 102. During production, this layer is lapped over, as indicated by the bracket 144, in order to provide support and holding power for the end cap 50. It is believed that the bond between the "body" 112 and the end cap develops substantial strength in its own right. However, since the end cap is a preformed and substantially fully cured element prior to joining with the wall segment 102, a join line of less than true monolithic nature is evident, as compared to the remainder of the truly monolithic structure. Since a true monolithic structure is the ultimate goal, the overlap area 144 is provided.

Within the extended scope of invention, the end cap 50 can be formed integrally while forming the wall segment 102. Although this produce some complexities of manufacture and increases the expense of the forming mandrel, as distinguished from the separately formed and applied end cap method of operation, it is nevertheless possible.

Optionally, a weld 146 can be applied by application of strip glass cloth and resin as a post-forming operation, for further strength if desired. This has not been found necessary in underground gasoline storage operations, however, because there are no great stress factors at this area in those situations. The forces involved are essentially the crushing forces of back fill earth. The ribs in the wall segment 102 fully withstand these forces. The convex curvature of the end cap 50 inherently withstands such forces also.

In the internally pressurized vessel illustrated in FIG. 3, the supplemental weld 146 may be desirable to withstand excessively high bursting forces.

The Assembled Tank Using Two Halves and the Center Joint

Figure 16:
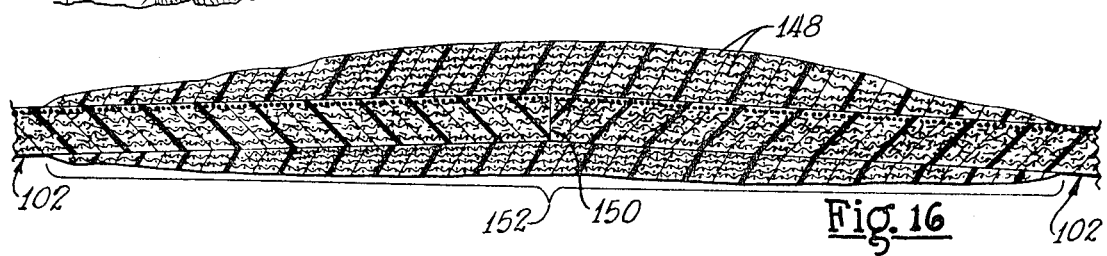
FIG. 16 is a fragmentary, sectional view, approximately actual size, showing the structure of a weld for joining two tank halves of the nature of FIG. 14, to produce a finished tank as shown in FIG. 17.

This is shown in detail in FIG. 16. Strips 148 of glass cloth are successively laid down and liberally coated with an air cure, catalyzed resin. Note that each layer of cloth is offset relative to the layer beneath. This spreads the weld over a substantial area on each side of the abutment line 150 between the two halves 102. Thus, the spread 152 of the weld area distributes the loading on each side of the abutment line 150; and also thickens the weld sufficiently to produce an absolutely fluid-proof seal.

A completed tank is shown in side elevational view in FIG. 17. This includes two half segments as made at a central manufacturing point and shipped in space-saving nested form to a local distribution or use point. A center weld 152, FIG. 16, is suitably made either at the local distribution point or at the actual point of use. Note that the crush-resistant ribs 104 are spaced axially along the tank. Note also that the two ribs at the center are spaced relatively close together so that the free edges of the tank segments 102 are rigidified and remain oriented in a true circle for effecting the field joint 152.

Figure 21:
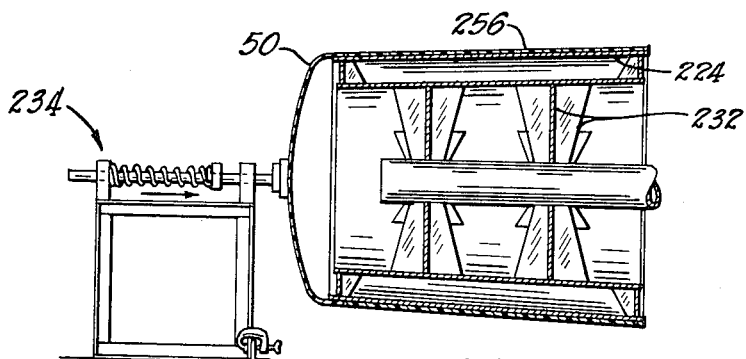
FIG. 21 is an axial sectional view of FIG. 20 after application of tank wall forming components.

Typical dimensions for a field-tested tank of the configuration shown in FIG. 21 are as follows:

Capacity: 6000 gallons

Wall Thickness: about one-fourth inch, including one thirty-second—one-sixteenth inch filament-wound layer.

Wall taper: about 1.5 degrees to permit mold release. This is not to be considered limiting on the invention. This figure is close to the minimum, however, that is necessary for release of the tank wall from the forming mandrel.

Length: each wall segment is about 9 feet long, tapering from 7 feet 9 inches diameter to about 7 feet diameter. The end caps 50 added about 16 inches of axial length. Therefore, in round numbers, the tank is about 8 feet in diameter, by about 20 feet long.

Rib spacing: the ribs as shown in FIG. 17 are spaced on about 22 inch centers. This puts the two center members about 16 inches apart.

Advantageous features of the tank of FIG. 17 for the underground storage of gasoline are as follows:

Sufficient strength in the peripheral ribs 102 to resist crushing forces of an earth overlay;

A naturally built-in sump 154, for accumulation of moisture, and also providing a loading point at the center of the tank;

A natural high point 156 for venting the tank, i.e., for the collection of gases within the tank above the contained liquid so that the gases can be expelled during the filling of the tank; and A suction point 158 that is away from the sump and loading point.

The Tank End or Cap Apparatus and Method

Figure 18:
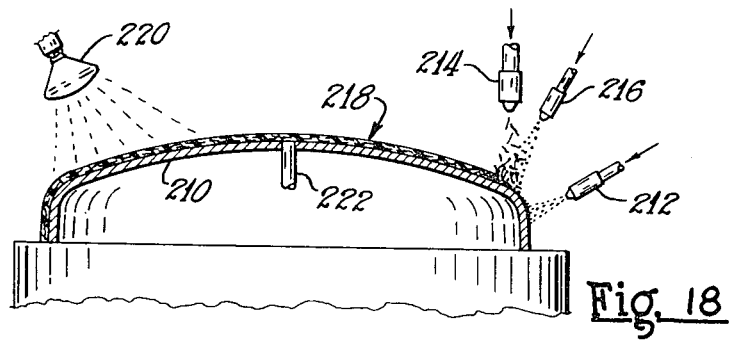
FIG. 18 is a sectional view illustrating end cap formation.

As shown in FIG. 18, a mandrel 210 of steel, aluminum, or other suitable material is utilized. This has an external contour equivalent to the contour of the cap 50 shown in FIG. 1. Other contours can be used for purposes of producing flat and concave structures.

To the mandrel 210, there is first applied a release agent by means of a gun 212 or, manually, by wiping with a cloth saturated with the material. The release agent is suitably a wax or the like to aid in removing the cured part from the polished surface of the mandrel 210.

To the coated mandrel 210, there is next applied, by suitable means, a matrix of liquid resin and chopped strand reinforcement material. One exemplary means for effecting this application comprises a gun 214 that chops strand and propels it by blowing toward the exterior surface of the mandrel 210. Simultaneously, as the chopped strand is flying through the air, a gun 216 produces a surrounding mist of resin, also directed toward the external surface of the mandrel 210. By so operating, a matrix is built up into a layer 218 over the surface of the mandrel.

An infrared lamp or heat source 220 is used for curing the wet lay-up.

Removal of the part from the mandrel 210 is suitably effected by lifting off. In some instances, an assist from a jet of air introduced, as by a built-in conduit 222, may be helpful.

The method steps that follow from the prior description include the following:

Coating a forming mandrel with a suitable release agent;

Applying chopped strand and resin and other components as necessary to proper thickness to develop an appropriate wet lay-up;

Curing the lay-up to a hard, solid condition; and

Stripping the cap from the mandrel.

This produces a cup-like piece that will nest, in the nature of paper cup lids. Such parts are shown in FIGS. 1 and 3.

Figure 19:
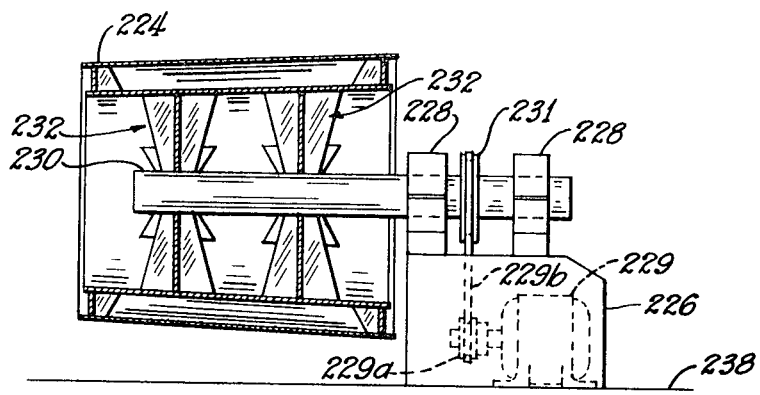
FIG. 19 is a sectional view illustrating the rotatable winding mandrel used to produce endless wall increments of invention.

The Side Wall Apparatus and Method The Mandrel for the Side Wall and its Rotation As shown in FIG. 19, the mandrel is designated 224. This is a hollow, open-ended, frusto-conical shell. The frusto-conical taper provides part release from the mandrel. The mandrel 224 is supported for rotation on a substantial base member 226 carrying bearings 228 at the top.

A rotatable shaft 230 is supported within the bearings 228, and extends into the interior of the shell structure 224 to support it in a cantilevered manner. This leaves the left end of the mandrel 224 exposed for application of the end cap, as will be discussed relative to FIG. 21. Spiders 232 radiate outwardly from the shaft 230 and are fastened at their outer ends to the interior of the mandrel 224.

Rotation of mandrel 224 is provided by a low speed motor mechanism 229. This suitably carries a pulley 229a on the output shaft. A pulley 231 is aligned on shaft 230. A driving connection is provided by a belt 229b.

The Apparatus for Holding the End Cap to the Side Wall Mandrel

Figure 20:
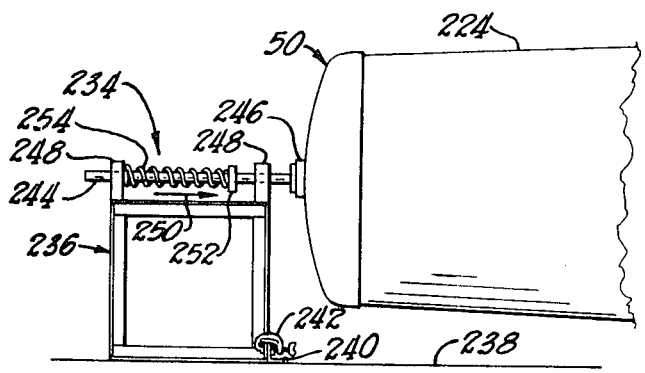
FIG. 20 is a fragmentary, side elevational view, showing the dead center used to hold an end cap in place on the winding mandrel.

Referring to FIG. 20, it will be noted that an end cap 50 is held in position at the end of the mandrel 224 by means of a dead-center mechanism 234. This includes a base 236. To the floor 238, there is suitably secured an angle iron 240. A clamp 242, or equivalent, is applied to hold the parts in operable relationship.

The dead-center per se comprises a shaft 244 having a rubber pad 246 at the right-hand end thereof. This serves as a contact member with the cap 50. The shaft 244 is journaled in bearing blocks 248. Also, in addition to being rotatable, the shaft 244 is axially movable, in order that bias or pressure may be imposed by way of the rubber pad 246 in the arrow 250 direction.

To provide the 250 biasing force, a collar 252 is fitted upon shaft 244. A compression spring 254 is applied upon shaft 244, between the collar 252 and the left-hand pillow block 248.

The apparatus and manner of forming the side wall lay-up to produce a wall increment 102 of either the ribbed or smooth configuration is schematically illustrated in FIG. 21. As there shown, a layer of material 256 has been applied over the outer surface of the mandrel 224. This is of a thickness the same as that of the end cap 50 and includes the components as shown in FIG. 7.

At this time, the filament overlay 118, as shown in FIG. 7, has not yet been applied. The manner in which this is done will be described later.

Figure 22:
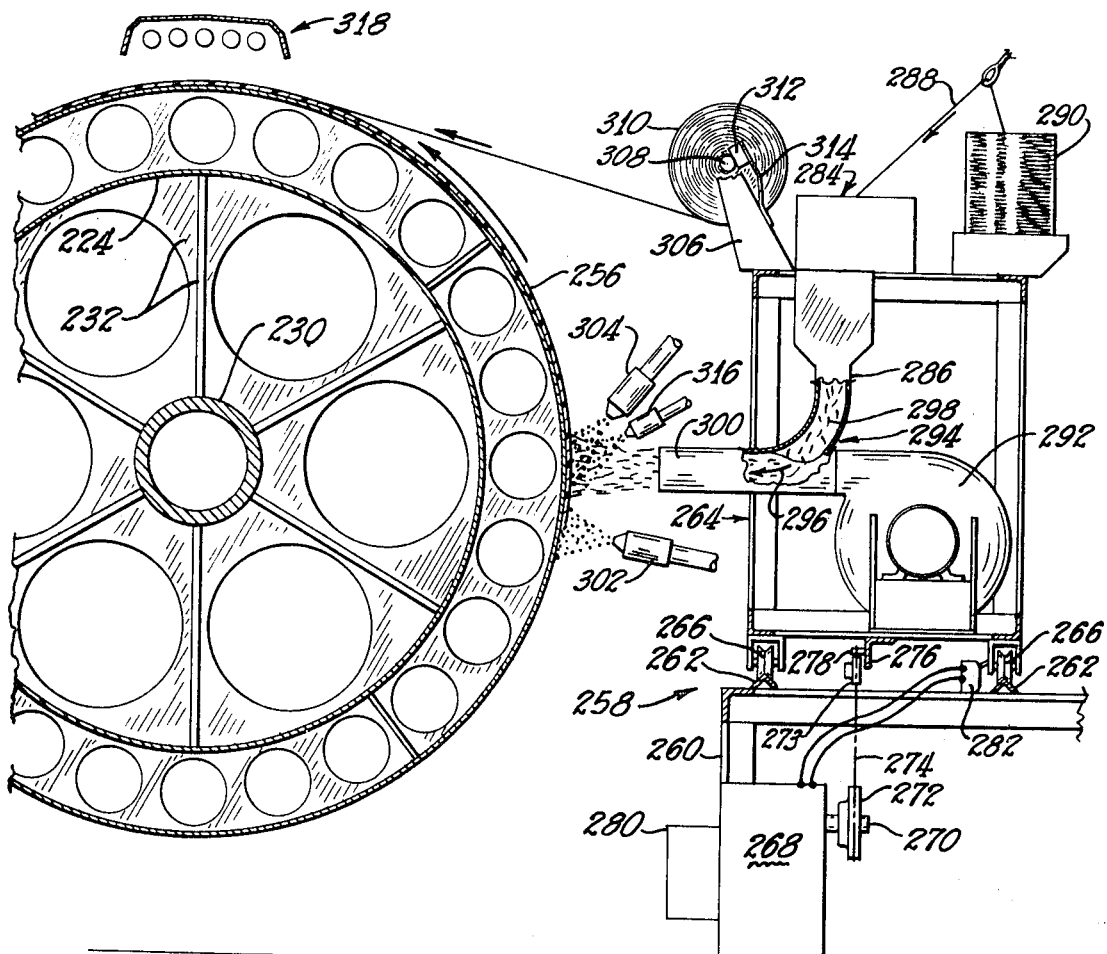
FIG. 22 is an end elevational view, partly in section, showing apparatus associated with the mandrel for applying the tank wall-forming components.

The Production Equipment Associated with the Mandrel for Developing the Stabilized Lay-Up This is shown in FIG. 22. Along one side of the mandrel 224 there is provided an elevated trackway system 258 that includes a frame structure 260 upon which two spaced tracks 262 are mounted in aligned relationship.

A carriage 264 is movable along tracks 262 by rollers 266 that are conformed to the tracks. Carriage 264 is used to carry a roving chopper, resin guns, and stabilizer application media. The carriage 264 is moved back and forth along the mandrel 224 in an ordered manner to apply the total chopped strand layer as a plurality of laminae, in order that a scrim stabilizer may be dispersed throughout the thickness of the layer.

For this purpose, a gear motor 268 is supported beneath the tracks 262, and has an output shaft 270 that carries a sprocket 272. A chain 274 laps the sprocket 272 and also laps an upper sprocket 273. At the far end of the frame 260 are similar sprockets to support chain 274.

Carriage 264 is provided with an angle iron 276. This receives a shear pin 278 that passes through the chain 274 and into a hole in the angle iron 276. In event of malfunction in either the carriage mechanism 264 or elsewhere, the shear pin disconnects the carriage from the drive chain 274. Also, since the traverse of the carriage 274 is quite slow, resetting of the mechanism is usually effected by removing the shear pin 278 and pushing the carriage back to starting position by hand.

The gear motor 268 is programmed by a control box 280 that establishes the speed of traverse and number of passes of the carriage 264. Limit switches 282 are placed at each end of the trackway for reversing purposes.

The Components on Carriage 264

A strand chopper 284 is supported at the top of carriage 264. This has a downwardly extending tubular conduit 286 that gravitationally carries and guides the chopped strands to a blower conduit 300.

Strand 288 is fed to the chopper 284 from suitable spools 290.

A motor-driven fan 292 has the outlet blended into the conduit 286 at the 90° curve point 294. In this construction, the exhaust stream from the fan 292 moving in the arrow direction 296 boosts and picks up the falling strand lengths 298. The air stream then shoots the strand lengths 298 from the outlet tube 300 with sufficient velocity to carry them into contacting engagement with the outer surface of the mandrel 224.

Also mounted on carriage 264 are three lower resin guns 302 and one upper gun 304.

This combination of elements 284, 300, 302 and 304 builds the matrix on the surface of the mandrel in an incremental layer as the carriage 264 is traversed axially along the length of the mandrel on the tracks 262. The total layer is ultimately built up in a number of passes, as indicated by the reference numeral 256 of FIG. 21.

The Scrim Application

A bracket 306 extends upwardly from carriage 264. A shaft 308 is rotatably journaled at the upper end of the bracket 306. A roll 310 of cotton scrim (open mesh cloth) is mounted on the shaft 308 and is paid out onto the chopped strand as it is increment-applied to the surface of the mandrel 224.

A brake pad 312 is mounted at the end of a leaf spring 314 and bears against shaft 308 to impose a slight drag thereon. The brake pad is effective to place just enough tension on the scrim roll 310 to hold the chopped strand and resin in place against fluid movement. This action can be called mechanical stabilization.

It should be noted at this point that glass cloth, glass scrim, cotton cheesecloth, a scrim made of Mylar-modified polyester fibers, and other materials can be utilized by application in the manner of the cotton scrim 310.

As an option, a gun 316 can be positioned next to the outlet tube 300 to apply a filler, such as a siliceous material. This would be effective to "extend" the resin as applied by the guns 304 and 302. Placement of the gun 316 at the point of application of the chopped strand provides appropriate admixture with the resin and complete wetting of the filler by the resin.

The Curing Radiants

Heat for curing the wet lay-up is generated by an infrared source, designated 318. However, these are not utilized in accordance with the preferred operation of the present invention until after the filament-wound layers are completely applied. Accordingly, a discussion of the manner in which these are used will be deferred until the next topic has been developed, namely, the filament-wound programming system as shown in FIG. 23.

Figure 23:
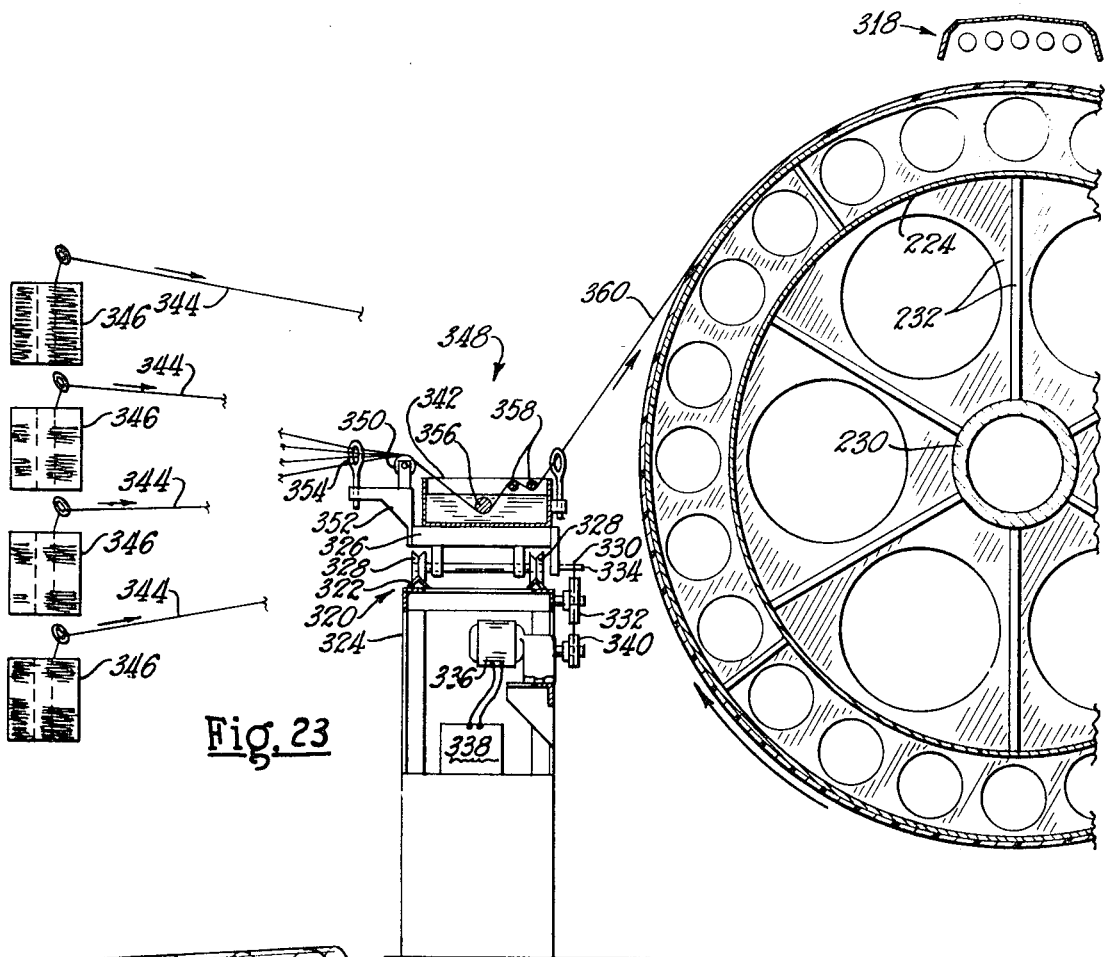
FIG. 23 is an end elevational view of the diametrically opposite side of the mandrel from FIG. 22, showing the filament winding apparatus.

The Filament-Winding Apparatus, FIG. 23

This includes a track system 320 extending along the opposite side of the mandrel 224 from the strand and scrim applying apparatus discussed relative to FIG. 22. The parallel tracks 322 are fastened to the top of a frame 324, which holds the tracks up at an appropriate height.

A carriage 326, provided with wheels 328, travels back and forth along the tracks 322.

A chain 330 is mounted for movement along one side of the track system 320 and is lapped over sprockets 332 rotatably mounted at each end of the frame 324. A shear pin type connection is provided between the carriage 326 and the chain 330 at the arrow point 334. This is effective to disengage the apparatus in the event of malfunction.

Traverse of the carriage 326 is effected by a gear motor 336 that is suitably programmed from a control box 338. The gear motor 336 is connected into the chain 330 system by means of a sprocket 340 carried on the output shaft.

It will be understood that as the carriage 326 is moved back and forth the full length of the mandrel 224, continuous strands saturated with liquid resin are applied in a criss-cross laid layer.

The wetting of the strand is effected using a flat container 342. The container 342 is mounted on top of the carriage 326 and the continuous rovings 344 are fed through a body of liquid resin retained at an appropriate level within container 342. By suitable mechanism to be described, the rovings 344 are permitted to pick up appropriate amounts of resin for the filament-wound overlay.

The rovings 344 are fed from packages 346 that are mounted a substantial distance from the traversing mechanism 348 so that they have sufficient length for alignment for proper passage through the dip tank 342. Additionally, the packages 346 are spaced a sufficient distance away from the traversing mechanism 348 to allow traverse of the combined number of rovings from one end to the other of the approximately 10 feet long mandrel 224.

A guide roll 350 is mounted on a rotatable shaft that is journaled on a bracket 352, extending outwardly from the carriage 326. Additionally, a gathering ring 354 is positioned ahead of the guide roll 350 to group the several rovings 344 into aligned relationship as they pass over the roll 350. The gathering ring 354 is also supported by the bracket 352 that is extended to the left for such purpose.

The combination of the gathering ring 354 and the guide roll 350 is effective to orient the rovings 344 for proper angle of entry into the bath of liquid resin contained within the tank 342.

A dip roller 356 is mounted within tank 342 and the rovings 344 pass beneath this structure to be submerged within the body of liquid resin. Aligned squeegee rollers or bars 358 are also supported within tank 342. As the wetted rovings pass into the nip between the elements 358, the resin picked up from the bath is reduced to a selected amount. For this purpose, it is to be understood that the elements 358 can be adjusted relatively to one another to close or open the nip therebetween.

The Traverse of the Continuous Rovings 344

As the mandrel 224 is turned, the carriage 326 is moved back and forth along the tracks 322. This is effective to lay the gathered rovings into the "fresh" or still wet, but stabilized, chopped strand layer previously applied as illustrated in FIG. 22.

It will be evident that due to the traverse of the wetted rovings 360 along the surface of the mandrel 224, the orientation of the rovings applied in overlay manner to the previously laid-up, resin-rich chopped strand layer is both axial and peripheral. This imparts strength in both axial and peripheral directions to the tank. Additionally, the criss-cross lay of the rovings 360 produces a high-strength shell structure.

Additionally, the traverse is adjusted to lay the rovings 360 carefully along the sloping sides 110 of the ribs 104, as shown in FIG. 25. Considerable care is exercised in getting this orientation quite exact in order to provide a smooth contour over the ribs.

Control at this point is provided by having a properly "dry" glass-to-resin ratio, or by spraying on catalyst at these points or applying polymerizing radiation to "gel" the underlay resin as continuous strands 344 are applied thereover.

Previously, it was mentioned that the filament windings are both axially and radially oriented on the surface of the structure. This is schematically shown in FIG. 24. In the extended scope of invention, the orientation can be utilized to control strength in any direction desired for a particular application. Thus, by orienting the filament-wound portion of the structure in an axial direction, axial strength is obtained. In the application as a storage tank, axial strength is not so necessary as radial strength because the bursting forces are inward in that direction. The earth overlay or back fill supports the tank end and the load it carries as regards axial stresses. However, in other applications, orientation as desired can be provided for appropriate strength.

Because of the need for radial strength, the barrel hoop structure discussed above, and as illustrated in FIG. 26, is emphasized. Actually, these are supplemented by the axial traverse of the rovings 360 to provide a combination of strength factors both axial and radial. These are just about balanced when a 45° helix is utilized.

The End Cap Overlay

As illustrated in FIG. 26, there is at least a hypothetical joint 142 between the end cap and the subsequently applied chopped strand matrix when the previously formed end cap 50 is laid up against the "fresh" resin in the layer 256 of FIG. 21. Although subsequent curing of the resin of the layer 256 should theoretically produce a monolithic-composite structure, added strength at the joint 142 is provided in accordance with the present invention.

It will be understood that this wetted rovings 360 are traversed beyond the joint 142. These are saturated with resin and "build" a grasping or a holding shell over the free edge of the end cap 50. The configuration of the overlay is also shown in detail in FIG. 15. There, the bracketed portion 144 indicates the degree to which the layer of filament-wound rovings 118 extends "beyond" the joint 142.

The ultimate result in this structure is, in effect, a monolithic composite when all of the resin applied "fresh" at this time is cured into solidified condition with that of the previously formed end cap. Substantially unitary or monolithic structure is produced due to the strength now inherent at the joint by the overlapping condition of the continuous strands, as indicated by the bracket 144.

In those instances where it is selected to produce the end cap with a glass cloth overlay, as optionally shown in FIG. 4, the glass cloth being designated 98, the overlapped roving will bond to it. This will in effect form an outer, high strength glass shell that is continuous over the entire tank surface.

The Peripheral Winds

It was previously mentioned that the plateau areas 108 of the ribs 104 were overlaid at the last portion of the cycle with a layer of peripheral wraps. This is designated 123 in FIG. 25. The peripherally wound strands are there shown in exaggerated view and individually designated 124. Note the manner in which they cross over the previously applied traverse rovings 360.

These peripheral winds are laid up by the equipment of FIG. 23. To effect this, the carriage 326 is very slowly traversed, with the mandrel 224 turning, along each of the plateau regions 108 of the ribs 104.

Compacting the Resin-Rich Chopped Strand Layer

Referring to FIG. 23, it is pointed out that the rovings 360 for the peripherally wound and applied layer 123 of FIG. 25 are not in a condition that can actually be called "tension." The condition is perhaps more aptly described as being "oriented." Thus, the continuous filaments are placed on the chopped strand layer with a methodical lay that is applied with just enough "drag" by the squeegee elements 358 in tank 342 to "lay it on" over the resin-rich layer. The effect is to "compact" or "body-up" the resin-rich layer 256. This expels entrained gases and also renders the chopped strand layer coherent or truly monolithic in structure.

Point of Novelty

It is at this precise point that the uniqueness of the scrim interlayer or stabilizer, designated 310 in FIG. 22, becomes so clearly apparent.

The resin-rich layer 256 is "mobile," but for the scrim stabilizer. Therefore, by the present invention, a "stabilized," "unified," or "monofied" layer is developed in a "wet" stage - - not heretofore presented by the art. Further, this is all unexpectedly accomplished in a single lay-up step, because, as previously mentioned, there has been no activating energy applied to gel the mobile resin in the least. Economics of operation greatly favor this type of procedure, and further, as discussed above, it is believed that a truly monolithic structure of unique strength characteristics is developed that has not heretofore been obtainable.

The Final Cure

This is now the point where the wet lay-up is cured into a hard, solid, or "set" monolithic composite.

Therefore, the radiants 318, indicated at the top of both FIGS. 22 and 23, are now turned on and their energy directed toward the mandrel 224, which continues to rotate. In an actual tank half of 3000 gallons capacity, having a quarter-inch thick lay-up wall of 8 feet diameter, about two to three rows of radiants were utilized about 18 inches above the surface of the mandrel, and these developed about 5,000 watts of radiating power. The mandrel was rotated at about 6 r.p.m. With this set of conditions, the quarter-inch thick resin was gelled through in about 1 hour, and total cure time was in the range of 2 to 3 hours. Actually, the external radiants 318 direct their rays through the wet lay-up and these are then reflected back from the surface of the mandrel. All portions of the resin are therefore activated effectively by the exterior type of energy application.

The Monolithic Result

In view of the foregoing, the final unitary polymerized body is of monolithic character that has "oneness" but yet inheres the unique structural strength and stress resistance characteristics of a composite structure wherein perhaps the most far-reaching importance in the performance and use of composites are the effects produced by the combination and/or interaction of the constituents thereof.

Here, a truly composite body has been produced, including the following materials:

The resin matrix;
Chopped strand randomly oriented in a resin-rich or resin-filled zone to provide strength in all directions;
Scrim stabilizer, holding the mobile body together;
Surfacing mats holding a pure resin surface for high corrosion resistance;
Optional flake layer for absolute fluid-imperviousness (this can be put on by the guns 316 in FIG. 22); and
Continuous strand overlays producing a "tough" outer shell.

Further a composite structure is inherent in the fact that an end cap of the type 50, FIG. 1, with or without a glass overlay, is combined with a tank body structure having a continuous shell overlay 360. The continuous shell overlay 360 is oriented to "grasp" or hold the end cap to the body along the overlap area 144, FIG. 26.

The effects of the combination of materials in the monolithic type composite structure produced by the invention may be summarized as follows:

SUMMATION OF THE INDIVIDUAL PROPERTIES OF THE CONSTITUENT MATERIALS

This happens when the contribution of each constituent is independently acting relative to the other components. Such factors appear at least in part here.

Complementing

Each constituent complements the others by contributing separate and distinct properties. Thus, the tank wall has radial crush resistance, by the hoop structures contained therein. The end cap is of convex construction and, therefore, has strength inherent in its configuration.

Supplementing

This results when a given property or action of one constituent is not independent of the property of action of another constituent. The resulting component properties are often higher than those of the constituent parts. This has taken place in the structures of this invention. There is radial burst resistance and radial crush resistance by the ribs; there is axial strength by the orientation along the axis of the structure as indicated in FIG. 24; there is end thrust resistance by the shape and construction of the end caps; and, further, there is corrosion resistance, light weight and utility, as enumerated hereinbefore.

The Method

In view of the foregoing, it becomes clearly apparent that a method inheres from the present invention. Broadly, the method steps are as follows:

1. Forming an end cap separately;
2. Positioning the end cap in space, as on the end of a tapered mandrel, and holding as by the use of a dead-center;
3. Orienting to the free edge of the end cap a resin-rich bodying layer of the nature of the end cap, i.e., resin-rich chopped strand for stiffness;
4. stabilizing the "mobile," resin-rich layer by means such as interposed strips, either continuous or incremental, of scrim;
5. Overlaying the total understructure, comprising end cap and body layer, with one or more properly oriented layers of spirally wound-on, continuous strands and orienting these axially and/or radially for strength in the direction necessary for particular applications;
6. Compacting the body structure produced by step 5 by means of the filament windings;
7. Developing a crush-resistant rib structure or step configuration as desired, simultaneously with the performance of steps 3–6; and
8. Developing inner and outer resin-rich surfaces for appropriate corrosion resistance.

The various embodiments by which the rib structures can be developed have been purposely omitted from the foregoing description in order to keep it as uncomplicated as possible. At this point, however, the various rib ramifications will be developed.

The Rib Formation

The molded-in rib

This has been shown in FIGS. 5, 6, 8, 11, 12, 13, 14, 15 and 17. In the preferred equipment embodiment for producing the molded-in rib, a smooth tapered mandrel has been employed for case of part release. This is shown in FIG. 21. When using this type of mandrel, ribs of high density glass fiberboard, containing cured phenolic resin for the bonding medium, are suitably utilized. As shown in FIGS. 27 and 28, these are cut to an external profile to which the ultimate rib is to conform. Here, the tapered sides 110 are of about 45° inclination. The ribs shown were cut from flat stock and saw 364 were formed transversely on the inside surface to permit the flat units to bend and conform to the outer surface of the forming mandrel. Other equivalent materials can be used, such as performed polyurethane foam ribs, and the like, and thus the invention is not limited to the high density glass fiber material.

Application of the structures shown in FIGS. 27 and 28 to the mandrel is effected in the manner shown in FIG. 29. Butt joints 366 are formed at all except the removal position 368. The ends then are scarfed, as at 370, for inward removal, indicated by arrow 374.

These units may be made in preformed circular configuration and slipped over the end of the mandrel, and positioned at spaced points therealong. Also, the segments, as illustrated in FIGS. 27 and 28, may be applied individually at certain points along the mandrel to build up the ribs. Note the internally applied fastening elements 372 in FIG. 29, such as a large screw, to hold the scarfed ends 370 together. By drawing this inwardly, along the arrow line 374, the rib can be removed and collapsed inwardly and separated from the cured tank half.

In a production operation, a release agent or release film, such as cellophane or Mylar, is first applied to each rib area of the mandrel, and the rib is then built over it. Over the rib there is then applied a fluid barrier, such as 1 mil. Mylar film. The reason for encasing the rib is that it is of spongelike nature; and thus, the liquid resin subsequently applied must be kept from saturating this piece so that it can be removed and not become a part of the laminate. This procedure is distinguishable from the method of operation discussed above relative to FIG. 12, wherein the porous rib was actually embedded in the side wall.

By encasing the ribs, however, they are isolated from the resin and thus can be stripped out and reused a number of times. This improves economy of operation and there is no real necessity for the strength the rib form material might contribute to the ultimate structure.

The above covers the formation of separate ribs in accordance with an actual production operation and worked very satisfactorily.

However, an extension of the invention suggests itself at this point. Thus, a spiral wrap of rib form material can be applied to the forming mandrel. This will develop the continuous spiral rib shown in FIG. 13.

As regards either one of the previous embodiments, i.e., separate rings or the spiral unit, these also could be individual rubber sleeves or boots, or a long, inflatable tube that would be spirally laid on the surface of the mandrel and the resin then applied. In short, a rib form as a separate attachment is to be encompassed within the scope of invention. In this method of operation, the finished molded tank and the rib form are both removed from the mandrel; then the rib is removed from the interior of the tank half shell. Reuse of the rib is therefore feasible.

The prior discussion has related to peripherally disposed strengthening ribs. In the extended scope of invention, axially oriented ribs can be used, by application of the principles set forth. These may even be used in combination with the peripheral ribs described. Further, the ribs plateau areas can be overlaid with glass cloth, as well as filament-wound materials.

Glass fibers or equivalent are usable as the reinforcement media.

Polyester resin systems have been employed in actual production according to the invention. However, extensions to epoxy systems, and acrylic systems are contemplated where the higher resin cost is justified. Actually the principles of the invention would be applicable with analogous materials where a transition from a liquid or mobile stage to a hardened stage is apparent.

As regards the center weld for producing a tank from two increment halves, it is to be understood that the major orientation of the strands will be along the tank axis, across the joint. By so operating, the center weld has sufficient strength to transmit stresses across the joint and flex enough to allow the entire tank to deflect a small amount under load.

A note relative to control of the mobility of the resin: during the development of the resin-rich layer 256, in FIG. 22, the right degree of "wetness" is to be considered an added factor and a further mechanical means of stabilization.

As a note of interest, a truncated cone form as used in this invention would be very difficult to render in steel, and expensive. A definite advantage as regards economy of shipment is therefore inherent in the invention that is substantially impossible in steel.

Stabilizing the Resin-Rich Layer

In the extended scope of invention, the stabilizing agent could be a thixotropic agent, added to the resin. However, in order to clearly distinguish from the art, the use of heat to body or gel the resin and thus hold it in place is not to be included within the scope of the invention. This two-step operation is previously dedicated to the art.

The distinct novelty here is in the manufacture of the fluid handling wall of invention in one curing step and thereby producing a monolithic but yet composite wall structure. In the production of similar wall structures by curing the underlayer to render it immobile, so that the filament windings can be put over without resin run-out, a different structure is believed to be formed. This is because of the parting line that is inherent between the two layers.

The Broader Method of The Half-Tank Concept

This method is schematically illustrated in FIG. 30 of the drawings.

Step 1:
Numeral I in the block diagram illustrates the manufacture of a tank wall increment. These could be tank halves.

Step 2:
Numeral II represents the production of a tank end cap.

Step 3:
Numeral III represents the nesting of 15 to 20 tank wall shells and a number of tank end caps on a railroad flatcar for shipment to one of a strategically located number of subassembly or distribution points of a commercial marketing pattern.

Step 4:
Numeral IV represents the completion of a number of different structural forms using the components shipped by the method step III. Thus, IV-a represents a storage tank such as discussed relative to FIG. 2 of the drawings. IV-b represents a simple storage shed structure. If this structure were inverted, and the top simply laid on and held there by gravity or suitable strap means, it would be representative of a grain storage bin. IV-c represents a high-pressure resistant tank of the type discussed relative to FIG. 3 of the drawings, or, with convex ends, an underground storage tank as in FIG. 17.

IV-d of FIG. 30 contemplates the shipment of wall increments only in nested form, with two types of nested end caps. These are put on later by field assembly.

IV-e depicts a pipeline; or if disposed vertically, a stand pipe or silo. In case of a pipeline, the wall increments would be made in relatively small diameter, and would be field-joined by a weld, as shown in FIG. 16. This open-end increment would form an ideal conduit system because of its corrosion resistance, both for the materials being pumped and for the environmental corrosive materials contained within the surrounding soil. Due to the light weight of these materials and their abrasion resistance, they could be joined up to substantial lengths on the surface and dropped into the ditch and covered. Rapid pipeline construction would be evident from this type of operation because the resin-rich layer is "there" for corrosion resistance. Accordingly, the complicated and expensive field wrapping and tar coating as now used to protect underground steel pipelines and the rather laborious welding procedures involved would be alleviated.

Summation

Steps I through IV are meant to illustrate the following broader method of fluid vessel manufacture:
Manufacturing wall and cap increments;

Shipping such components in nested form for economy of transportation, to a subassembly distribution point or actual use site, for final fabrication by field joints to provide a wide variety of tanks, fluid conduits, shelters and others, by appropriate selection and combination of the components.

What is claimed is:

1. The method of making a storage tank comprising the steps of:
   1. applying a release agent to the exterior frustro conical surface of a cantilevered mandrel rotatable about a longitudinal axis,
   2. providing an end cap at the free smaller end of said mandrel,
   3. simultaneously
      (a) rotating said mandrel about its axis and
      (b) spraying onto said frustro-conical surface a mixture of chopped glass fiber and curable organic resin to build up an appreciable layer thereon completely peripherally encasing said mandrel in merged relation with said end cap.
   4. curing said organic resin while the sprayed-on layer and end cap remain in situ on said mandrel,
   5. telescopically removing the cured layer and end cap as a unit from said mandrel, thereby forming a tank half,
   6. repeating steps 1–5 to form a second, identical tank half,
   7. and joining the large ends of said identical tank halves to form a completed tank.

2. The method as defined in claim 1, wherein the step 3b is carried out by axially displacing along the length of said mandrel in a direction parallel to the axis of mandrel rotation a stream of air-borne chopped glass fibers and at least one stream of liquid resin converging substantially at the surface of said mandrel, the rotation of the mandrel and the axial displacement of said streams depositing on said mandrel a uniform peripherally encasing layer of admixed fibers and resin.

3. The method as defined in claim 2, wherein a continuous web of fibrous scrim material is applied under tension and during rotation of said mandrel immediately following deposition of said layer of admixed fibers and resin to stabilize the deposited layer prior to curing.

4. The method of claim 3, wherein step 3b is repeated after the performance of the step of claim 3 to build up successive layers of fiber and resin prior to the performance of step 4, and the performance of step 4 forms an integrated monolithic mass from said successive layers.

5. The method of claim 1, wherein a continuous layer of filament wound glass fiber roving is applied to the layer of fiber and resin prior to the performance of step 4.

6. The method of claim 4, wherein as additional steps and prior to the performance of step 4, a plurality of axially spaced peripheral ribs are superimposed on the plurality of layers of fiber and resin built up on said mandrel and an additional layer of chopped fiber and resin is sprayed over said ribs as the mandrel is rotated.

7. The method of claim 4, wherein as additional steps and prior to the performance of step 4, a plurality of axially spaced peripheral ribs are superimposed on the plurality of layers of fiber and resin built up on said mandrel and an additional layer of filament wound glass fiber roving applied over said ribs as the mandrel is rotated.

8. The method of making a storage tank comprising the steps of:
   1. applying a release agent to the exterior frustro conical surface of a cantilevered mandrel rotatable about a longitudinal axis,
   2. positioning and retaining an end cap at the free smaller end of said mandrel,
   3. simultaneously
      (a) rotating said mandrel about its axis and
      (b) spraying onto said frusto-conical surface a mixture of chopped glass fiber and curable organic resin to build up an appreciable layer thereon completely peripherally encasing said mandrel and at least partially overlapping said end cap,
   4. curing said organic resin while the sprayed-on layer and end cap remain in situ on said mandrel,
   5. telescopically removing the cured layer and end cap as a unit from said mandrel, thereby forming a tank half,
   6. repeating steps 1–5 to form a second, identical tank half,
   7. and joining the large ends of said identical tank halves to form a completed tank.

* * * * *